US006615170B1

(12) United States Patent
Liu et al.

(10) Patent No.: US 6,615,170 B1
(45) Date of Patent: Sep. 2, 2003

(54) MODEL-BASED VOICE ACTIVITY DETECTION SYSTEM AND METHOD USING A LOG-LIKELIHOOD RATIO AND PITCH

(75) Inventors: Fu-Hua Liu, Scarsdale, NY (US); Michael A. Picheny, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/519,960

(22) Filed: Mar. 7, 2000

(51) Int. Cl.[7] .............................................. G10L 15/20
(52) U.S. Cl. ....................................... 704/233; 704/231
(58) Field of Search ................................ 704/205, 207, 704/233, 1

(56) References Cited

U.S. PATENT DOCUMENTS

| | | | | | |
|---|---|---|---|---|---|
| 5,812,965 | A | * | 9/1998 | Massaloux | 704/205 |
| 6,009,391 | A | * | 12/1999 | Asghar et al. | 704/222 |
| 6,070,136 | A | * | 5/2000 | Cong et al. | 704/222 |
| 6,219,642 | B1 | * | 4/2001 | Asghar et al. | 704/243 |
| 6,240,386 | B1 | * | 5/2001 | Thyssen et al. | 204/201 |
| 6,349,278 | B1 | * | 2/2002 | Krasny et al. | 704/226 |
| 6,351,731 | B1 | * | 2/2002 | Anderson et al. | 704/225 |

OTHER PUBLICATIONS

Steven F. Boll, “Suppression of Acoustic Noise in Speech Using Spectral Subtraction,” IEEE Transactions on Acoustics, Speech, and Signal Processing, vol. ASSP–27, No. 2, pp. 113–120, Apr. 1979.

Rabiner et al., “Application of an LPC Distance Measure to the Voiced–Unvoiced–Silence Detection Problem,” IEEE Transactions on Acoustics, Speech, and Signal Processing, vol. ASSP–25, No. 4, pp. 338–343, Aug. 1977.

Rangoussi et al., “Higher Order Statistics Based Gaussianity Test Applied to On–Line Speech Processing,” In Proc. of the IEEE Asilomar Conf., pp. 303–807, 1995.

El–Maleh et al., “Comparison of Voice Activity Detection Algorithms for Wireless Personal Communications Systems,” Proc. IEEE Canadian Conference on Electrical and Computer Engineering (ST. John s, Nfld.), pp. 470–473, May 1997.

Bahl et al., “Performance of the IBM Large Vocabulary Continuous Speech Recognition System on the ARPA Wall Street Journal Task”.

* cited by examiner

*Primary Examiner*—Doris H. To
*Assistant Examiner*—Michael N. Opsasnick
(74) *Attorney, Agent, or Firm*—F. Chau & Associates, LLP

(57) ABSTRACT

A system and method for voice activity detection, in accordance with the invention includes the steps of inputting data including frames of speech and noise, and deciding if the frames of the input data include speech or noise by employing a log-likelihood ratio test statistic and pitch. The frames of the input data are tagged based on the log-likelihood ratio test statistic and pitch characteristics of the input data as being most likely noise or most likely speech. The tags are counted in a plurality of frames to determine if the input data is speech or noise.

18 Claims, 2 Drawing Sheets

MODEL-BASED VOICE ACTIVITY DETECTION SYSTEM AND METHOD USING A LOG-LIKELIHOOD RATIO AND PITCH

BACKGROUND OF THE INVENTION

1. Field of the Invention

The present invention relates to speech recognition, and more particularly to a system and method for discriminating speech (silence) using a log-likelihood ratio and pitch.

2. Description of the Related Art

Voice activity detection (VAD) is an integral and significant part of a variety of speech processing systems, comprising speech coding, speech recognition, and hands-free telephony. For example, in wireless voice communication, a VAD device can be incorporated to switch off the transmitter during the absence of speech to preserve power or to enable variable bit rate coding to enhance capacity by minimizing interference. Likewise, in speech recognition applications, the detection of voice (and/or silence) can be used to indicate a conceivable switch between dictation and command-and-control (C&C) modes without explicit intervention.

For the design of VAD, efficiency, accuracy, and robustness are among the most important considerations. Many prevailing VAD schemes have been proposed and used in different speech applications. Based on the operating mechanism, they can be categorized into a threshold-comparison approach, and a recognition-based approach. The advantages and disadvantages are briefly discussed as follows.

The underlying basis of a threshold-comparison VAD scheme is that it extracts some selected features or quantities from the input signal and then compare these values with some thresholds. (See, e.g., K. El-Maleh and P. Kabal, "Comparison of Voice Activity Detection Algorithms for Wireless Personal Communications Systems", *Proc. IEEE Canadian Conference on Electrical and Computer Engineering*, pp. 470–473, May 1997; L. R. Rabiner, et al., "Application of an LPC Distance Measure to the Voiced-Unvoiced-Silence Detection Problem," *IEEE Trans. on ASSP*, vol. ASSP-25, no. 4,pp. 338–343, August 1977; and M. Rangoussi and G. Carayannis, "Higher Order Statistics Based Gaussianity Test Applied to On-line Speech Processing," In Proc. of the *IEEE Asilomar Conf.*, pp. 303–307, 1995.) These thresholds are usually estimated from noise-only periods and updated dynamically.

Many early detection schemes used features like short-term energy, zero crossing, autocorrelation coefficients, pitch, and LPC coefficients (See, e.g., L. R. Rabiner, et al. as cited above). VAD schemes in modern systems in wireless communication, such as GSM (global system for mobile communications) and CDMA (code division multiple access), apply adaptive filtering, sub-band energy comparison (See, e.g., K. El-Maleh and P. Kabal as cited above), and/or high-order statistics (See, e.g., M. Rangoussi and G. Carayannis as cited above).

A major advantage of the threshold-comparison VAD approach is efficiency as the selected features are computationally inexpensive. Also, they can achieve good performance in high-SNR environments. However, all these arts rely on either empirically determined thresholds (fixed or dynamically updated), the stationarity assumption of background noise, or the assumption of symmetry distribution process. Therefore, there are two issues to be addressed, including robustness in threshold estimation and adaptation, and ability to handle non-stationary and transient noises (See, e.g., S. F. Boll, "Suppression of Acoustic Noise in Speech Using Spectral Subtraction," *IEEE Trans. on Acoustics, Speech, and Signal Processing*, Vol. ASSP-27, No. 2, pp. 113–120, April 1979).

For recognition-based VAD, the recent advances in speech recognition technology have enabled its widespread use in speech processing applications. The discrimination of speech from background silence can be accomplished using speech recognition systems. In the recognition-based approach, very accurate detection of speech/noise activities can be achieved with the use of prior knowledge of text contents.

However, this recognition-based operation may be too expensive for computation-sensitive applications, and therefore, it is mainly used for off-line applications with sufficient resources. Furthermore, it is language-specific and the quality highly depends on the availability of prior knowledge of text. Therefore, this kind of approach needs special consideration for the issues of computational resources and language-dependency.

Therefore, a need exists for a system and method which overcomes the deficiencies of the prior art, for example, the lack of robustness in threshold estimation and adaptation, the lack of the ability to handle non-stationary and transient noises and language-dependency. A further need exists for a model-based system and method for speech/silence detection using cepstrum and pitch.

SUMMARY OF THE INVENTION

A system and method for voice activity detection, in accordance with the invention includes the steps of training speech/noise Gaussian models by inputting data including frames of speech and noise, and deciding if the frames of the input data include speech or noise by employing a log-likelihood ratio test statistic and pitch. The frames of the input data are tagged based on the log-likelihood ratio test statistic and pitch characteristics of the input data as being most likely noise or most likely speech. The tags are counted in a plurality of frames to determine if the input data is speech or noise.

In other methods, the step of deciding if the frames of the input data include speech or noise by employing a log-likelihood ratio test statistic may include the steps of determining a first probability that a given frame of the input data is noise, determining a second probability that the given frame of the input data is speech and determining a LLRT statistic by taking a difference between the logarithms of the first probability from the second probability. The step of determining a first probability may include the step of comparing the given frame to a model of Gaussian mixtures for noise. The step of determining a second probability may include the step of comparing the given frame to a model of Gaussian mixtures for speech.

In still other methods, the step of tagging the frames of the input data based on the log-likelihood ratio test statistic and pitch characteristics may include the step of tagging the frames according to an equation Tag(t)=f(LLRT, pitch) where Tag(t)=1 when a hypothesis that a given frame is noise is rejected and Tag(t)=0 when a hypothesis that a given frame is speech is rejected. The program storage device as recited in claim 11, wherein the step of counting the tags in a plurality of frames to determine if the input data is speech or noise includes the step of providing a smoothing window of N frames to provide a normalized cumulative count between adjacent frames of the N frames and to smooth transitions between noise and speech frames. The step of providing a smoothing window of N frames may include the formula: w(t)=exp (−αt), where w(t) is the smoothing window, t is time, and α is a decay constant. The step of providing a smoothing window of N frames may include the formula: w(t)=1/N, where w(t) is the smoothing window, and t is time. The step of providing a smoothing window of N frames may include w(t)=1 for t=0 and otherwise w(t)=0, where w(t) is the smoothing window, and t is time. The step of counting the tags may include the steps of comparing a normalized cumulative count to a first threshold and a second threshold, if the normalized cumulative count is above or equal to the first threshold and the current tag is most likely speech, the input data is speech and if the normalized cumulative count is below to the second threshold and the current tag is most likely noise, the input data is noise. The methods may be performed by a program storage device readable by machine, tangibly embodying a program of instructions executable by the machine to perform the method steps.

A method for training voice activity detection systems, in accordance with the invention, includes the.steps of inputting training data, the training data including both noise and speech, aligning the training data in a forced alignment mode to identify speech and noise portions of the training data, labeling the speech portions and the noise portions, clustering the noise portions to achieve noise Gaussian mixture densities to be employed as noise models, and clustering the speech portions to achieve speech Gaussian mixture densities to be employed as speech models.

The methods may be performed by a program storage device readable by machine, tangibly embodying a program of instructions executable by the machine to perform the method steps. The step of aligning the training data in a forced alignment mode to identify speech and noise portions of the training data may be performed by employing a speech decoder. The step of clustering the noise portions may include clustering the noise portions in accordance with a plurality of noise ambient environments.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
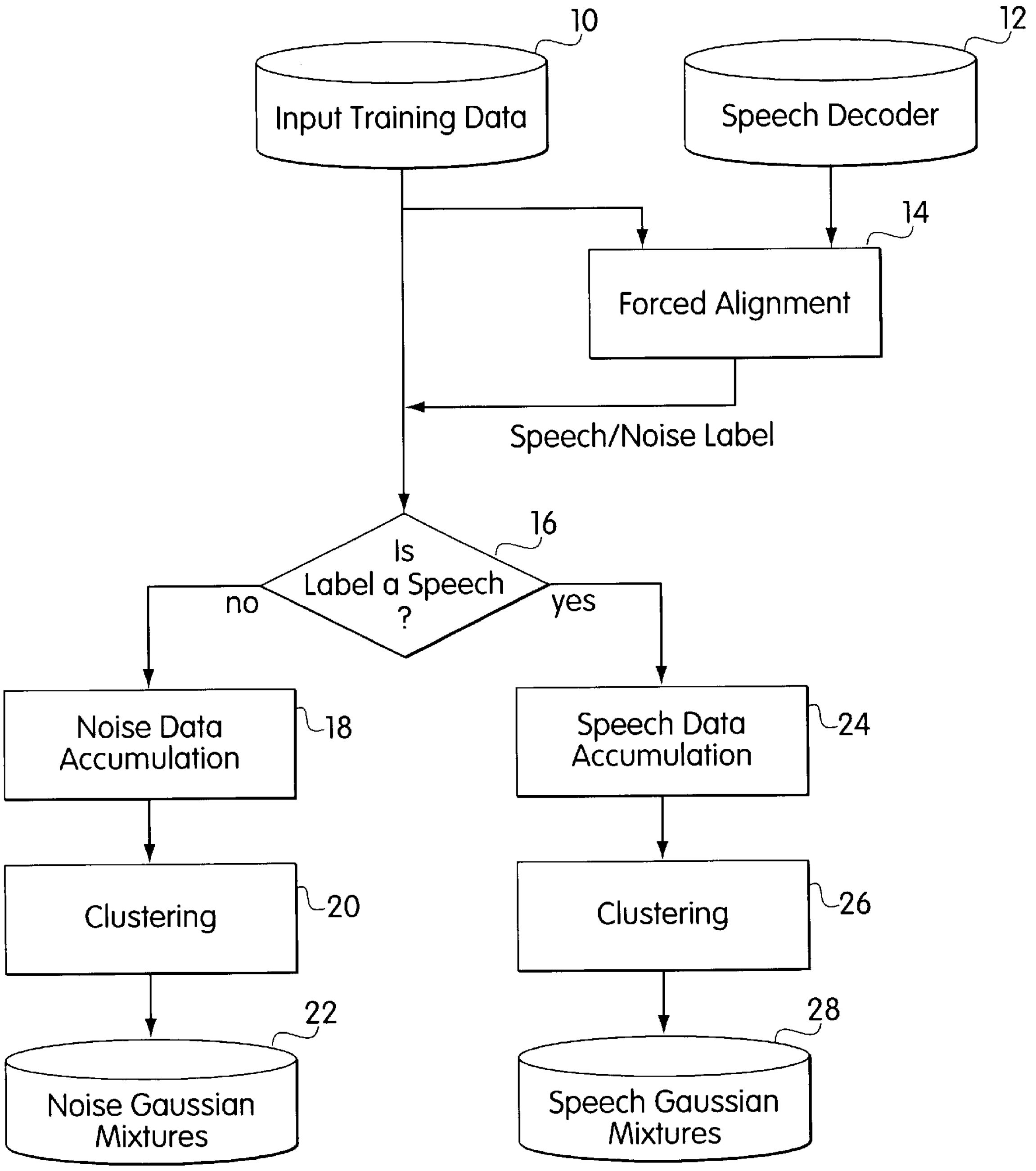
FIG. 1 is a block/flow diagram of a system/method for training speech and noise models including Gaussian mixture densities in accordance with the present invention.

The present invention includes a voice activity (VAD) system and method based on a log-likelihood ratio test statistic and pitch combined with a smoothing technique using a running decision window. To maintain accuracy, the present invention utilizes speech and noise statistics learned from a large training database with help from a speech recognition system. To achieve robustness to environmental changes, the need for threshold calibration is eliminated by applying the ratio test statistic. The effectiveness of the present invention is evaluated in the context of speech recognition compared with a conventional energy-comparison scheme with dynamically updated thresholds. A training procedure of the invention advantageously employs cepstrum for voice activity detection.

Log-Likelihood Ratio Test for VAD

The VAD method for the present invention is similar to the threshold-comparison in that it employs measured quantities for decision-making. The present invention advantageously employs log-likelihood ratio and pitch. The dependency on empirically determined thresholds is removed as the log-likelihood ratio considers similarity measurements from both speech and silence templates. The algorithm also benefits from a speech recognition system when templates are to be built in the training phase. An example of a speech recognition which may be employed is disclosed in L. R. Bahl, et al., "Performance of the IBM Large Vocabulary Continuous Speech Recognition System on the ARPA Wall Street Journal Task," ICASSP-95; 1995.

Log-Likelihood Ratio Test (LLRT)

Assume that both speech and noise observations can be characterized by individual distributions of Gaussian mixture density functions: Let x(t) be the input signal at time t. The input signals may include acoustic feature vectors, say for example, 24-dimension cepstral vectors. Two simple hypotheses may be defined as follows:

$H_0$ input is from probability distribution of noise $H_1$ input is from probability distribution of speech The probabilities for x(t), given it is a noise frame, and given it is a speech frame, can be written, respectively as:

$$\begin{cases} P_{0t} = Prob(x(t) \mid H_0) \\ P_{1t} = Prob(x(t) \mid H_1) \end{cases} \quad (1)$$

We then define a likelihood ratio test statistic as:

$$\gamma(t) = \frac{P_{1t}}{P_{0t}} \quad (2)$$

Then the following decisions may be made based on the likelihood ratio test statistic as:

$$\begin{cases} \text{if } \gamma(t) \geq \frac{1-\beta}{\alpha}, \text{ then Reject } H_0 \\ \text{else if } \gamma(t) \leq \frac{\beta}{1-\alpha}, \text{ then Reject } H_1 \\ \text{else if } \frac{\beta}{1-\alpha} < \gamma(t) < \frac{1-\beta}{\alpha}, \text{ then Pending} \end{cases} \quad (3)$$

where α and β are the probabilities for a type I error and type II error, respectively. A type I error is to reject $H_o$ when it should not be rejected, and a type II error is to not reject $H_o$ when it should be rejected. For computational consideration and simplicity, a log-likelihood ratio test (LLRT) statistic or cepstrum is then defined as:

$$\hat{\gamma}(t)=\log (P_{1t})-\log (P_{0t}) \quad (4)$$

By choosing $\alpha+\beta=1$, Equation (3) can be rewritten as:

$$\begin{cases} \hat{\gamma}(t) \geq 0 & \text{Reject } H_0 \\ \hat{\gamma}(t) < 0 & \text{Reject } H_1 \end{cases} \tag{5}$$

Equation (4) and Equation (5) are the building blocks used in the VAD method of the present invention. A score tag, Tag(t), is generated for each input signal, x(t), based on the LLRT statistic or the decision to reject or accept $H_0$. A simple case to produce score tags is that Tag(t)=1when $H_0$ is rejected and Tag(t)=0 when $H_1$ is rejected.

Pitch For VAD

Pitch is a feature used in some speech applications such as speech synthesis and speech analysis. Pitch can be used as an indicator for voiced/unvoiced sound classification. Pitch is calculated for speech parts with properties of periodicity. For consonants like fricatives and stops, pitch simply does not exist. Likewise, background noises do not exhibit pitch due to the lack of periodicity. Therefore, pitch itself is not an obvious choice for voice activity detection because the absence of pitch cannot distinguish consonants from background noise.

However, in accordance with the present invention, the combination of cepstrum and pitch as the selected feature for voice activity detection surprisingly improves overall performance. First, the information conveyed in cepstrum is useful in reducing the false silence errors as observed in the cepstrum-only case described above. The information from pitch is effective in lowering the false speech errors as observed in the pitch-only case. To combine these two features, the score tags can be expressed as a function of "LLRT statistic" (cepstrum) and pitch:

$$\text{Tag}(t)=f(\text{LLRT, Pitch}) \tag{6}$$

where Tag(t) is a decision function. Illustrative Tag functions which include pitch may include the following illustrative example:

$$\begin{aligned} Tag(t) &= f(LLRT, \text{ pitch}) \\ &= \lambda \cdot score1(t) + (1-\lambda) \cdot score2(t) \end{aligned} \tag{7}$$

$$\text{where: } score1(t) = \begin{cases} 1, & \text{when } \hat{\gamma}(t) \geq 0 \\ 0, & \text{when } \hat{\gamma}(t) < 0 \end{cases}$$

$$score2(t) = \begin{cases} 1, & \text{with pitch} \\ 0, & \text{without pitch} \end{cases}$$

$\lambda$ is a weighting factor for LLRT which may be experimentally determined or set in accordance with a user's confidence that pitch is present. In one embodiment, $\lambda$ may be set to 0.5.

The LLRT statistic and pitch produce score tags on a frame-by-frame basis. The speech/non-speech classification based on this score tag may over-segment the utterances to make it unsuitable for the speech recognition purposes. To alleviate this issue, a smoothing technique based a running decision window is adopted.

Smoothing Decision Window

The smoothing window serves two purposes. One is to integrate information from adjacent observations and the other to incorporate continuity constraint to manage the "hangover" periods for transition between speech and noise sections.

Let c(t) be the normalized cumulative count of the score tag from the LLRT statistic in a N-frame-long decision window ending at time frame t. It can be expressed as:

$$c(t) = \frac{\sum_{\tau=0}^{N-1} w(\tau) \cdot Tag(t-\tau)}{\sum_{\tau=0}^{N-1} w(\tau)} \tag{8}$$

where w(t) is the running decision window of N frames long, and $\tau$ is the summation index. The running decision window, w(t), can be used to emphasize some score tags by different weighting on observations at different times. For -example, an exponential weight function $w(t)=\exp(-\alpha t)$, may be used for emphasize more recent score tags, where $\alpha$ is a decay constant or function for adjusting time. Another example, can include only looking at a current tag such that w(t)=1 when t=0; otherwise, w(t)=0. Yet another example, may include w(t)=1/N, where N is the number of frames. Then, the final classification algorithm is described as:

$$\begin{cases} Tag(t) = 1 \text{ AND } c(t) \geq TH1 & \Rightarrow \text{speech} \\ Tag(t) = 0 \text{ AND } c(t) < TH2 & \Rightarrow \text{noise} \\ \text{Otherwise} & \Rightarrow \text{unchanged} \end{cases} \tag{9}$$

where TH1 and TH2 are the normalized thresholds for speech floor and silence ceiling, respectively. An illustrative example of threshold values may include TH1=0.667 and TH2=0.333.

Note that these normalized thresholds are essentially applied to control the "hangover" periods to ensure proper segment length for various speech processing applications. Unlike the conventional threshold-comparison VAD algorithms, they are robust to environmental variability and do not need to be dynamically updated.

Experimental Setup and Results

Two sets of experiments were carried out by the inventors. The first one evaluated the effectiveness of extracted features for LLRT. The second one involved evaluation of the VAD for the present invention in modeless speech recognition, in which C&C and dictation may be mixed with short pauses.

A set of training data was used to train a standard large-vocabulary continuous speech recognition system. The set of training data included 36000 utterances from 1300 speakers. 2000 utterances of training data were used in the first experiment to evaluate various features and to determine the number of Gaussian mixtures for speech and silence models. Two sets of test data were collected for the second experiment in the context of speech recognition in a modeless mode. One test included the Command-and-Control (C&C) task, in which each utterance included multiple C&C phrases with short pauses in between. The test included 8 speakers with 80 sentences from each speaker. Another test set included a mix C&C/dictation (MIXED) task, where C&C phrases are embedded in each dictation utterance with short pauses wrapped around. This set included 8 speakers with 68 sentences from each speaker.

A large-vocabulary continuous speech recognition system, namely, the system described in L. R. Bahl, et al., "Performance of the IBM Large Vocabulary Continuous Speech Recognition System on the ARPA Wall Street Journal Task," ICASSP-95, 1995, was used in the following experiments. In summary, it uses MFCC-based front-end signal processing in a 39-dimensional feature vector computed every 10 micro-seconds. The acoustic features are labeled according to the sub-phonetic units constructed using a phonetic decision tree. Then, a fast match decoding with context independent units is followed by a detailed match decoding with context dependent units. A finite-state grammar and a statistical language model are enabled in the decoder to handle commands and dictation.

First, individual Gaussian mixture distributions are obtained for speech and silence during the training procedure steps. The first step is to label the training data. This is accomplished by using the speech recognition system in a forced alignment mode to identify the speech and silence sections given the correct word. Given contents, forced alignment determines the phonetic information for each signal segment using the same mechanism for speech recognition. In the second step, different mixtures of Gaussian densities for speech signals are established using observations labeled as speech in the first step. Likewise, silence models are trained using data labeled as noise.

Given the correct text contents, the speech/noise labels from forced alignment are treated as correct labels.

For each set of Gaussian mixtures, different cepstrum-based features are evaluated, including static cepstrum (Static CEP), linear discriminant analysis (LDA), and time derivative dynamic cepstrum (CEP+Delta+DD). Spliced CEP+LDA is computed by performing LDA on splice CEP (say, for example, 9-frame CEP can be produced by concatenating the previous four and the following 4 frames).

Table 1 compares the labeling error from various features used in LLRT. It shows that cepstrum with its time derivatives (CEP+Delta+DD) yields the best classification result. In general, the performance improves with more Gaussian mixtures for speech and noise distributions.

TABLE 1

Features versus detection performance for LLRT-based method of the present invention

| Mixture Size | Extracted Feature in LLRT: CEP + Delta + DD | Spliced CEP + LDA | Static CEP | Static CEP + LDA |
|---|---|---|---|---|
| 2 | 7.6 | 7.2 | 12.1 | 12.4 |
| 4 | 7.1 | 7.3 | 12.2 | 13.7 |
| 8 | 7.3 | 8.8 | 12.7 | 13.2 |
| 16 | 6.7 | 8.3 | 12.7 | 13 |
| 32 | 6.5 | 7.4 | 12.7 | 12.6 |
| 64 | 6.2 | 7.2 | 12.5 | 12.5 |
| 128 | 6.2 | 7.3 | 12.5 | 12.5 |
| 256 | 6.1 | 7.3 | 12.5 | 12.5 |

Note that detection error rates include more false silence errors than false speech errors partly due to latent mislabeling from forced alignment and partly due to the fact that some low-energy consonants are confusing with background noise.

Note that the cepstrum-based features are primarily chosen for the LLRT statistic in this invention with a major advantage that the efficiency can be maximized by using the same front-end.

Speech Recognition

In this test, the speech decoder runs in a modeless fashion, in which both finite-state grammar and statistical language model are enabled. While the decoder can handle connected phrases without VAD, the detection of a transition between speech and silence from VAD suggests to the decoder a latent transition between C&C phrases and/or dictation sentences.

The first test data was the C&C task, in which each utterance included 1 to 5-command phrases with short pauses ranging approximately from 100 micro-seconds and 1.5 seconds. Table 2 compares the recognition results obtained when the LLRT-based VAD, a conventional adaptive energy-comparison VAD (Energy-Comp.), or no VAD (Baseline) is used.

TABLE 2

Recognition Comparison in the C & C task between LLRT-VAD, conventional energy comparison and no VAD.

| Speaker | WORD ERROR RATE (%): LLRT | Energy - Comp. | Baseline |
|---|---|---|---|
| 1 | 2.3 | 10.9 | 11.5 |
| 2 | 4.5 | 5.7 | 3.7 |
| 3 | 11.4 | 17.3 | 16.8 |
| 4 | 1.4 | 2.3 | 4.1 |
| 5 | 13.4 | 20.9 | 24.1 |
| 6 | 5.8 | 9.1 | 8.8 |
| 7 | 1.4 | 11.8 | 11.5 |
| 8 | 3.7 | 15.6 | 16 |
| Overall | 5.4 | 11.7 | 12.1 |

The performance difference between the LLRT-based-VAD and the no-VAD cases is quite significant, with a surprisingly big difference between the LLRT-based VAD and the conventional adaptive energy-comparison VAD.

Table 3 compares the results for the MIXED task, in which the embedded command phrases are bounded by short pauses.

TABLE 3

Recognition Comparison in the MIXED task between LLRT-VAD, conventional energy comparison and no VAD.

| Speaker | WORD ERROR RATE (%): LLRT | Energy - Comp. | Baseline |
|---|---|---|---|
| 1 | 18.3 | 22.8 | 21.9 |
| 2 | 22.1 | 22.6 | 20.9 |
| 3 | 38.8 | 37.5 | 37.9 |
| 4 | 19.8 | 18.9 | 19.3 |
| 5 | 32.6 | 33.9 | 35.5 |
| 6 | 39.6 | 44.4 | 45.3 |
| 7 | 19 | 22.6 | 23 |
| 8 | 22.5 | 24.2 | 24.6 |
| Overall | 26.6 | 28.4 | 28.5 |

It is shown that the LLRT-based VAD improves the overall word error rate to 26.6% in contrast to 28.5% when no VAD is used. It is noteworthy that the smaller improvement from the LLRT-based VAD is observed in the MIXED task than in the C&C task. It is due to the artifact that preceding decoded context before each speech/noise transition is discarded such that the language model stifles on the dictation portions.

LLRT VAD in Noisy Environments

To test the robustness of VAD, another set of noisy test data is collected from one male speaker by playing a pre-recorded cafeteria noise during recording, including the NOISY-C&C and NOISY-MIXED task. Two microphones are used simultaneously, a close-talk microphone and a desktop-mounted microphone. The comparison of recognition results for noisy data is shown in Table 4. It reveals that the LLRT-based VAD method of the present invention is robust with respect to environmental variability by achieving similar performance improvement over the baseline system. The poor performance from the reference energy-comparison approach is likely caused by its inability to cope with different background noise environments.

TABLE 4

Recognition Comparison in noisy data between LLRT-VAD, conventional energy comparison and no VAD.

| TASK | WORD ERROR RATE (%) | | |
|---|---|---|---|
| (Microphone) | LLRT | Energy - Comp. | Baseline |
| NOISY - C & C Close - talk | 0.8 | 5.8 | 5.8 |
| NOISY - MIXED desktop - mount | 8 | 13.6 | 12.6 |
| NOISY - MIXED Close - talk | 16.7 | 18.8 | 18.9 |
| NOISY - C & C desktop - mount | 35.9 | 41.5 | 41.5 |

Figure 2:
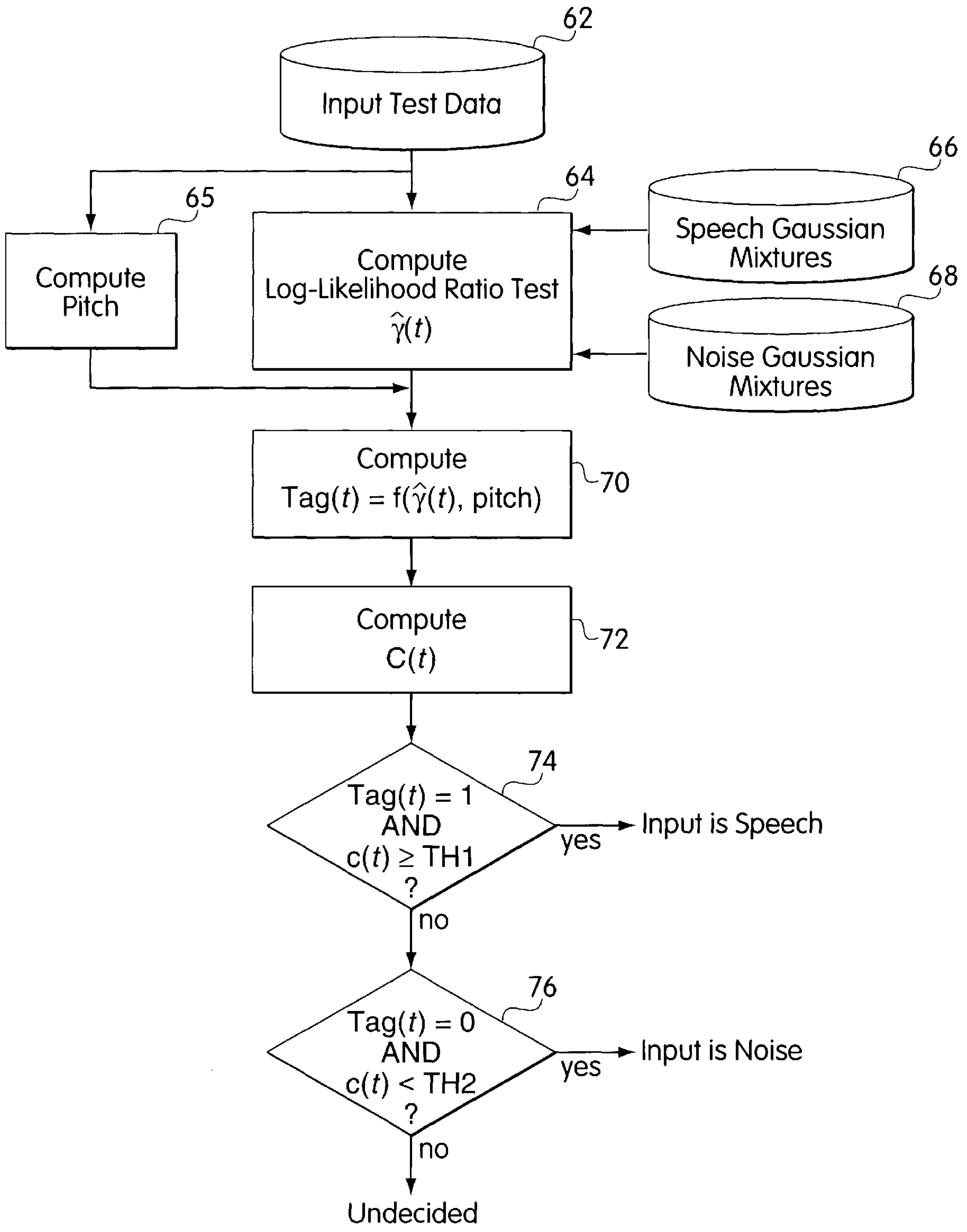
FIG. 2 is a block/flow diagram of a system/method for voice activity detection in accordance with the present invention.

It should be understood that the elements shown in FIGS. 1–2 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, a training system/method for voice activity-detection is shown in accordance with the present invention. In the present invention, noise and speech in the training data are advantageously classified using a speech decoder 12 in a forced alignment mode in block 14, in which speech decoder 12 classifies speech/silence part of the training data given the knowledge of text contents of training data from block 10. Once the labels are obtained as output from forced alignment in block 14, the training data from block 10 is divided into speech and noise in block 16.

In block 18, noise data is accumulated for the noise labeled training data. In this way, the noise data is pooled for clustering. The noise data is clustered into classes or clusters to associate similar noise labeled training data, in block 20. Clustering may be based on, for example, different background ambient environments. In block 22, noise Gaussian mixtures densities are output to provide noise models for voice activity detection in accordance with the present invention. Noise Gaussian mixture distributions are trained for noise recognition.

In block 24, speech data is accumulated for the speech labeled training data. In this way, the speech data is pooled for clustering. The speech data is clustered into classes or clusters to associate similar speech labeled training data, in block 26. Clustering may include different sound clusters, etc. In block 28, speech Gaussian mixture densities are output to provide speech models for voice activity detection in accordance with the present invention. Speech Gaussian mixture distributions are trained for speech recognition. It is to be understood that the speech and noise models may be employed in speaker dependent and speaker-independent systems.

The following table compares the performance of our VAD scheme using a composite database with two different data sources. A first set includes 720 command phrases from three different speakers and the second set contains only breath noises.

TABLE 5

Comparison in terms of detection error rate between selected features used in VAD, including cepstrum, pitch and a combination of cepstrum and pitch.

| | Detection Error Rate | | |
|---|---|---|---|
| | Cepstrum | Pitch | Cepstrum + Pitch |
| False Silence Error for Speech | 10.7 | 32 | 15 |
| False Speech Error for Breath Noise | 51.9 | 0 | 0 |
| Average | 31.3 | 16 | 7.5 |

The results show that a combination of cepstrum and pitch retains good rejection for breath noises for the pitch-based VAD while maintaining good performance in clean environments as the cepstrum-based VAD.

Referring now to FIG. 2, a system/method for voice activity detection is shown in accordance with the present invention. In block 62, test data is input to the system for voice activity detection, where x(t) is the input signal at time t, e.g., input test data from block 62. Test data may include speech mixed with noise. In block 64, $\hat{\gamma}(t)$ is calculated in accordance with Equations (2) or (4) to complete a Log-Likelihood Ratio Test (LLRT) based on speech Gaussian mixtures from block 66 and noise Gaussian mixtures from block 68. The hypotheses are defined for probability distribution of noise $H_0$ and for the probability distribution of speech $H_1$. The probabilities for x(t), given it is a noise frame, and given it is a speech frame, can be written for $P_{0t}$ and $P_{1t}$ in Equation (1). Input from blocks 66 and 68 is preferably derived from the training of models in FIG. 1, where the models output at blocks 22 and 28 provide the input for determining probabilities based on LLRT.

In block 70, a score tag, Tag(t), is generated for each input signal, x(t), based on the LLRT statistic of block 64 and pitch computed in block 65 to make a decision to reject or accept $H_o$ as described above. Pitch is computed in block 65 for each input signal, x(t). Pitch may be computed by conventional means. A simple example to produce score tags may include Tag(t)=1 when $H_0$ is rejected and Tag(t)=0 when $H_1$ is rejected.

In block 72, a normalized cumulative count c(t) of the score tag is computed based on from the LLRT statistic and pitch in a N-frame-long decision window ending at time frame t. It can be expressed as Equation (8). In block 74, if Tag(t)=1 at time t and c(t) is greater than or equal to a first threshold count (which may be fixed disregarding environments), then the input x(t) is determined to be speech. In block 76, if Tag(t)=0 and c(t) is less than a second threshold count, then the input is determined to be noise and rejected. Otherwise, if the criteria for blocks 74 and 76 are not met, then the nature of the input signal is undecided and the status remains unchanged.

In this invention, a novel voice activity detection system and method are disclosed with the use of log-likelihood ratio test. The LLRT statistic takes into account the similarity scores from both speech and silence templates simultaneously. Therefore, it is more robust with respect to the background noise environments than the conventional threshold-comparison approaches. Further, surprising improvements are gained when pith is considered along with LLRT to detect voice. Combined with a smoothing technique based on a running decision window, the present invention is capable of preserving continuity constraints and easily controlling the "hangover" periods to ensure proper segment length. When the invention is applied for speech recognition, the efficiency can be further maximized by using the same feature vectors.

Having described preferred embodiments of a model-based voice activity detection system and method using a log-likelihood ratio and pitch (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for voice activity detection, comprising the steps of:

inputting data including frames of speech and noise;

deciding if the frames of the input data include speech or noise by employing a log-likelihood ratio test statistic and pitch;

tagging the frames of the input data based on the log-likelihood ratio test statistic and pitch characteristics of the input data as being most likely noise or most likely speech; and counting the tags in a plurality of frames to determine if the input data is speech or noise, wherein counting the tags includes the step of providing a smoothing window of N frames to provide a normalized cumulative count between adjacent frames of the N frames and to smooth transitions between noise and speech frames.

2. The method as recited in claim 1, wherein the step of deciding if the frames of the input data include speech or noise by employing a log-likelihood ratio test statistic includes the step of:

determining a first probability that a given frame of the input data is noise;

determining a second probability that the given frame of the input data is speech; and determining a LLRT statistic by taking a difference between the logarithms of the first probability from the second probability.

3. The method as recited in claim 2, wherein the step of determining a first probability includes the step of comparing the given frame to a model of Gaussian mixtures for noise.

4. The method as recited in claim 2, wherein the step of determining a second probability includes the step of comparing the given frame to a model of Gaussian mixtures for speech.

5. The method as recited in claim 1, wherein the step of tagging the frames of the input data based on the log-likelihood ratio test statistic and pitch characteristics include the step of tagging the frames according to an equation:

$$\mathrm{Tag}(t)=f(\mathrm{LLRT},\ \mathrm{pitch})$$

where Tag(t)=1 when a hypothesis that a given frame is noise is rejected and Tag(t)=0 when a hypothesis that a given frame is speech is rejected.

6. The method as recited in claim 1, wherein the step of providing a smoothing window of N frames includes the formula:

$$w(t)=\exp\ (-\alpha t),$$

where w(t) is the smoothing window, t is time, and $\alpha$ is a decay constant.

7. The method as recited in claim 1, wherein the step of providing a smoothing window of N frames includes the formula:

$$w(t)=1/N,$$

where w(t) is the smoothing window, and t is time.

8. The method as recited in claim 1, wherein the step of providing a smoothing window of N frames includes w(t)=1 for t=0 and otherwise w(t) =0, where w(t) is the smoothing window, and t is time.

9. The method as recited in claim 1, wherein the step of counting the tags further comprises the steps of:

comparing a normalized cumulative count to a first threshold and a second threshold;

if the normalized cumulative count is above or equal to the first threshold and the current tag is most likely speech, the input data is speech; and if the normalized cumulative count is below to the second threshold and the current tag is most likely noise, the input data is noise.

10. A program storage device readable by machine, tangibly embodying a program of instructions executable by the machine to perform method steps for voice activity detection, the method steps comprising:

inputting data including frames of speech and noise;

deciding if the frames of the input data include speech or noise by employing a log-likelihood ratio test statistic and pitch;

tagging the frames of the input data based on the log-likelihood ratio test statistic and pitch characteristics of the input data as being most likely noise or most likely speech; and counting the tags in a plurality of frames to determine if the input data is speech or noise, wherein counting the tags includes the step of providing a smoothing window of N frames to provide a normalized cumulative count between adjacent frames of the N frames and to smooth transitions between noise and speech frames.

11. The program storage device as recited in claim 10, wherein the step of deciding if the frames of the input data include speech or noise by employing a log-likelihood ratio test statistic includes the steps of:

determining a first probability that a given frame of the input data is noise;

determining a second probability that the given frame of the input data is speech; and determining a LLRT statistic by taking a difference between the logarithms of the first probability from the second probability.

12. The program storage device as recited in claim 11, wherein the step of determining a first probability includes the step of comparing the given frame to a model of Gaussian mixtures for noise.

13. The program storage device as recited in claim 11, wherein the step of determining a second probability includes the step of comparing the given frame to a model of Gaussian mixtures for speech.

14. The program storage device as recited in claim 10, wherein the step of tagging the frames of the input data based on the log-likelihood ratio test statistic and pitch characteristics include the step of tagging the frames according to an equation:

$$\mathrm{Tag}(t)\ f(\mathrm{LLRT},\ \mathrm{pitch})$$

where Tag(t)=1 when a hypothesis that a given frame is noise is rejected and Tag(t)=0 when a hypothesis that a given frame is speech is rejected.

15. The program storage device as recited in claim 10, wherein the step of providing a smoothing window of N frames includes the formula:

$$w(t)=\exp(-\alpha t),$$

where w(t) is the smoothing window, t is time, and $\alpha$ is a decay constant.

16. The program storage device as recited in claim 10, wherein the step of providing a smoothing window of N frames includes the formula:

$$w(t)=1/N,$$

where w(t) is the smoothing window, and t is time.

17. The program storage device as recited in claim 10, wherein the step of providing a smoothing window of N frames includes w(t)=1 for t=0 and otherwise w(t)=0, where w(t) is the smoothing window, and t is time.

18. The program storage device as recited in claim 10, wherein the step of counting the tags further comprises the steps of:

comparing a normalized cumulative count to a first threshold and a second threshold;

if the normalized cumulative count is above or equal to the first threshold and the current tag is most likely speech, the input data is speech; and if the normalized cumulative count is below to the second threshold and the current tag is most likely noise, the input data is noise.

* * * * *